(12) United States Patent
Salmon

(10) Patent No.: US 8,953,327 B1
(45) Date of Patent: Feb. 10, 2015

(54) SELF-WINDING MEMBRANE DEVICE

(75) Inventor: Peter C. Salmon, Mountain View, CA (US)

(73) Assignee: iBlaidZ, Inc., Mountain View, CA (US)

( * ) Notice: Subject to any disclaimer, the term of this patent is extended or adjusted under 35 U.S.C. 154(b) by 137 days.

(21) Appl. No.: 13/477,828

(22) Filed: May 22, 2012

Related U.S. Application Data

(60) Provisional application No. 61/490,422, filed on May 26, 2011.

(51) Int. Cl.
*H05K 7/00* (2006.01)

(52) U.S. Cl.
USPC ............... 361/728; 361/679.01; 361/679.04; 361/679.05; 361/679.06; 361/679.26; 361/679.27; 361/379.56; 242/375; 242/375.3; 242/380; 242/381.1; 242/381.3; 33/755; 33/762; 33/767; 33/770; 345/174; 345/581; 160/242; 40/610

(58) Field of Classification Search
USPC .......... 361/728; 242/375, 375.3, 380, 381.01, 242/381.3; 33/755, 762, 767, 770; 345/174, 345/581; 160/242; 40/610
See application file for complete search history.

(56) References Cited

U.S. PATENT DOCUMENTS

| | | | | |
|---|---|---|---|---|
| 3,744,733 A | * | 7/1973 | Bennett | 242/381.3 |
| 3,963,854 A | * | 6/1976 | Fowler | 174/36 |
| 4,030,775 A | * | 6/1977 | Hill | 280/477 |
| 4,200,983 A | * | 5/1980 | West et al. | 33/767 |
| 4,587,738 A | * | 5/1986 | Kang | 33/762 |
| 4,704,798 A | * | 11/1987 | Hird | 33/763 |
| 4,903,912 A | * | 2/1990 | Coughlin | 242/381.1 |
| 4,945,650 A | * | 8/1990 | Hird | 33/763 |
| 4,972,601 A | * | 11/1990 | Bickford et al. | 33/770 |
| 4,982,910 A | * | 1/1991 | Bickford | 242/375 |
| 5,605,312 A | * | 2/1997 | Elder et al. | 248/230.7 |
| 5,820,057 A | * | 10/1998 | Decarolis et al. | 242/375.3 |
| 6,131,844 A | * | 10/2000 | Hsu | 242/380 |
| 6,137,454 A | | 10/2000 | Peck | |
| 6,276,071 B1 | * | 8/2001 | Khachatoorian | 33/767 |
| 6,375,165 B1 | * | 4/2002 | Sherratt et al. | 256/24 |
| 6,445,290 B1 | * | 9/2002 | Fingal et al. | 340/539.32 |
| 6,550,155 B1 | * | 4/2003 | Hsu | 33/755 |
| 6,762,929 B2 | * | 7/2004 | Sawyer | 361/679.05 |
| 7,219,709 B1 | * | 5/2007 | Williams | 160/24 |
| 7,344,260 B2 | * | 3/2008 | Derenski | 359/601 |
| 7,415,289 B2 | | 8/2008 | Salmon | |
| 7,426,107 B2 | * | 9/2008 | Yeh et al. | 361/679.27 |

(Continued)

FOREIGN PATENT DOCUMENTS

WO WO 2008/059345 A2 5/2008

*Primary Examiner* — Xiaoliang Chen
(74) *Attorney, Agent, or Firm* — Kilpatrick Townsend & Stockton LLP

(57) ABSTRACT

A device having a self-winding element is described. The self-winding element is built on a flexible membrane; it has an extended form and a retracted form. Stiffness in the extended form may be provided using membrane curvature, or a retractable support member may be used, or both. Transitions between the extended form and the retracted form are preferably accomplished using sequential activation of tensile members that are configured in segments of the membrane. Activation of the tensile elements is preferably implemented using a processor or controller that activates tri-state drivers in a predetermined sequence in order to pass a current through each element when heating is desired. A preferred material used for the tensile elements is thin film NITINOL.

3 Claims, 4 Drawing Sheets

(56) References Cited

U.S. PATENT DOCUMENTS

| | | | |
|---|---|---|---|
| 7,558,057 B1* | 7/2009 | Naksen et al. | 361/679.56 |
| 8,220,520 B2* | 7/2012 | Lukos | 160/242 |
| 8,548,607 B1* | 10/2013 | Belz et al. | 700/21 |
| 8,590,170 B2* | 11/2013 | Wagner | 33/760 |
| 2005/0253775 A1* | 11/2005 | Stewart | 345/1.1 |
| 2006/0060313 A1* | 3/2006 | Lukos | 160/242 |
| 2006/0082518 A1* | 4/2006 | Ram | 345/1.1 |
| 2006/0166713 A1* | 7/2006 | Yeh et al. | 455/575.1 |
| 2006/0249091 A1* | 11/2006 | Orbach | 119/169 |
| 2006/0266867 A1* | 11/2006 | Critelli et al. | 242/375 |
| 2007/0153379 A1* | 7/2007 | Mikkelsen et al. | 359/461 |
| 2008/0034604 A1* | 2/2008 | Critelli et al. | 33/767 |
| 2008/0086925 A1* | 4/2008 | Yang | 40/610 |
| 2008/0121349 A1* | 5/2008 | De La Cruz | 160/23.1 |
| 2008/0144265 A1* | 6/2008 | Aoki | 361/681 |
| 2008/0158795 A1* | 7/2008 | Aoki et al. | 361/681 |
| 2008/0183307 A1* | 7/2008 | Clayton et al. | 700/8 |
| 2008/0183316 A1* | 7/2008 | Clayton | 700/90 |
| 2008/0204367 A1* | 8/2008 | Lafarre et al. | 345/55 |
| 2008/0221715 A1* | 9/2008 | Krzyzanowski et al. | 700/90 |
| 2008/0247126 A1* | 10/2008 | Otsuka et al. | 361/681 |
| 2008/0289775 A1* | 11/2008 | Lukos | 160/242 |
| 2008/0318633 A1* | 12/2008 | Wong et al. | 455/566 |
| 2009/0051830 A1* | 2/2009 | Matsushita et al. | 348/836 |
| 2009/0100599 A1* | 4/2009 | Rawls-Meehan | 5/616 |
| 2009/0121660 A1* | 5/2009 | Rawls-Meehan | 318/16 |
| 2009/0139663 A1* | 6/2009 | Cutler | 160/3 |
| 2010/0007950 A1* | 1/2010 | Yuzawa | 359/461 |
| 2010/0164973 A1* | 7/2010 | Huitema et al. | 345/581 |
| 2010/0182738 A1* | 7/2010 | Visser et al. | 361/679.01 |
| 2010/0231421 A1* | 9/2010 | Rawls-Meehan | 341/20 |
| 2010/0243176 A1* | 9/2010 | Cutler et al. | 160/66 |
| 2010/0246113 A1* | 9/2010 | Visser et al. | 361/679.3 |
| 2010/0281441 A1* | 11/2010 | Eldon et al. | 715/864 |
| 2011/0043479 A1* | 2/2011 | van Aerle et al. | 345/174 |
| 2011/0071558 A1* | 3/2011 | Dlugos et al. | 606/157 |
| 2011/0176260 A1* | 7/2011 | Walters et al. | 361/679.01 |
| 2011/0213472 A1* | 9/2011 | Clayton et al. | 700/11 |
| 2012/0002357 A1* | 1/2012 | Auld et al. | 361/679.01 |
| 2012/0014054 A1* | 1/2012 | Ashcraft et al. | 361/679.26 |

* cited by examiner

SELF-WINDING MEMBRANE DEVICE

CROSS-REFERENCES TO RELATED APPLICATIONS

This patent claims priority to U.S. Provisional Patent Application No. 61/490,422, filed on May 26, 2011, entitled "Self-winding Membrane Device", the disclosure of which is hereby incorporated by reference in its entirety for all purposes.

TECHNICAL FIELD

This invention relates to devices that are wound or coiled and more particularly to self-winding membrane devices.

REFERENCES CITED

"Thin film shape memory alloy microactuators", Krulevitch, P. et. al., Journal of Microelectromechanical Systems, Volume 5, Issue 4, December 1996.

"Hybrid Microcircuit Technology Handbook: Materials, Processes, Design . . . ", James J. Licari et. al., 2nd edition, Noyes Publications, 1998, pp 82-84.

BACKGROUND

The size of electronic devices ranges from the very small to the very large. Gaming devices, portable data assistants (PDAs) and other portable computing devices, laptops, cell phone, smart phones, video players, music players, medical devices, and numerous other types of electronic devices are typically provided in sizes and shapes that are convenient for a user to hold, carry, and transport, for example, by being able to fit within a user's purse or pocket. For example, portable electronic devices are beginning to be used as personal computing platforms, combining computational power and communication capabilities with user convenience in a compact form. Typically such devices include a display used to present pertinent information to the user and, in some cases, the display surface can also be used as a touch sensitive input device. A popular form of such a portable electronic device fits comfortably in a shirt pocket.

Thin flat flexible sheets may be used as substrates for displays of electronic devices. For example, polyester (PET and PEN) films are available in many thicknesses such as 25 micrometers (1 mil) to 250 micrometers (10 mils). These films are flexible; for example they bend under gravity when draped over a shaped object.

Adding curvature to the geometry of a sheet makes it behave like a shell. A shell carries loads through a combination of "membrane response" and bending response. Membrane response or "shell response" can cause a shell to become relatively stiff.

Examples of curved shells include arched panels and cylindrical pipes. An egg shell also provides a good example of strength and response of a curved shell. When loaded primarily in "membrane mode" the egg shell is very strong. However, if loaded locally in bending, the load capacity is low and the shell may break.

Sputtered thin films of metal alloys comprising titanium and nickel known as NITINOL are capable of achieving high recoverable stresses of the order of 350 MPa, while having fatigue performance corresponding to thousands of cycles of actuation for the case of strain of approximately 3% or less, as described by Krulevitch et. al. New methods for fabricating thin film NITINOL at an attractive cost are under development, for example using Chemical Vapor Deposition, CVD.

Tantalum nitride (TaN) thin film resistors are rugged and stable; they have a typical sheet resistance of 100 ohms per square and good power-handling capabilities, as described by Licari et. al.

Despite the progress made in the displays and other components of electronic devices, there is a need in the art for improved devices and methods of making such devices.

SUMMARY OF THE INVENTION

Devices having a retractable element employing a flexible membrane substrate are disclosed. The retractable element has an extended form and a retracted form. It may be configured to be mechanically stable in the extended form by creating curved features in the membrane; these provide stiffening using the "membrane response". The curved features are preferably achieved by heat forming or using attached thin film tensile elements. Alternatively, one or more support members may be provided to support an essentially planar element in extended form. A process for retracting the membrane into an enclosure may employ sequential activation of a first set of thin film tensile elements. Similarly, a process for extending the membrane for use as a display or other device may employ sequential activation of a second set of thin film tensile elements. The device may be integrated with a host or companion device, or it may be a stand-alone device having a wired or wireless link to a host device.

DETAILED DESCRIPTION

Figure 1:
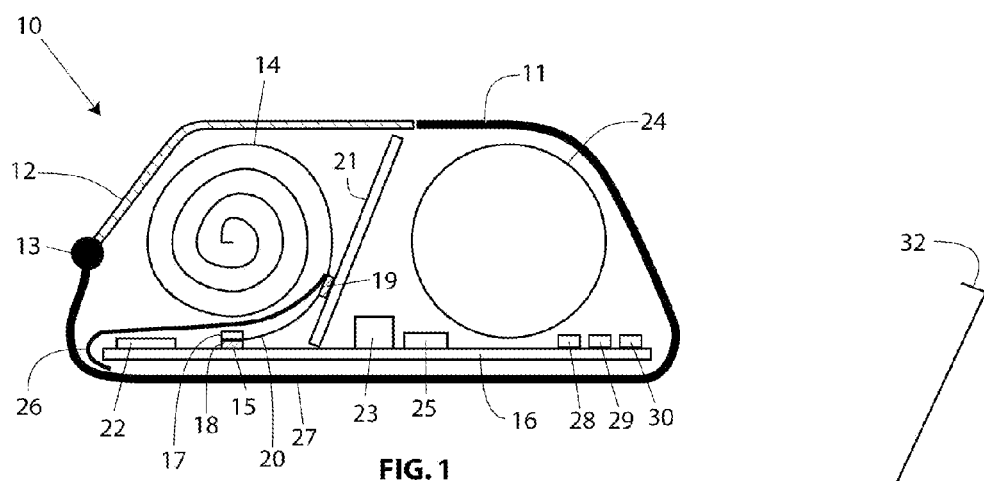
FIG. 1 is a cross-sectional side view of a device wherein the extendable element is retracted (the "retracted form").

Various embodiments of the present invention are described hereinafter with reference to the figures. It should be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and may be practiced in other embodiments. In this application, a membrane is defined as "a thin layer that is easily bent under normal circumstances"; the term "membrane" need not have a biological origin or basis. The use of curvature to stiffen the membrane is not a "normal circumstance". "Easily bent" can be interpreted as bending under gravity when draped over a shaped object. PEN films are described merely as examples. Any membrane or film having a suitable flexibility, preferably having a flexural modulus in the range of 1-10 GPa, can be used. Polyester (PET) films and polyimide (PI) films may be suitable, depending on cost and temperature performance requirements for example. A cooling device may employ a metallic foil as the membrane for example. Membrane flexibility is desired for ease of manipulation during extension and retraction. "Film" and "membrane" are terms that are used interchangeably herein. Extendable membrane elements may vary in size from microscopic devices having their diagonal dimension measured in nanometers to meters. The extendable membrane elements may implement many useful functions, including but not limited to a display, a keyboard, a touch screen, a heating or cooling device, a screen for displaying a projected image, an antenna, or a sound-producing device. Furthermore, a useful device may comprise multiple film layers; wherein, for example, one or more layers comprises the self-winding capability described herein. The device may also incorporate multiple functions, for example, a display screen combined with a touch sensor.

The preferred method for supplying heat to activate the tensile elements, is to pass a current through them to create joule heating. An alternate method is to provide a resistive pad underneath or on top of the tensile element, the pad comprising a resistive material such as tantalum nitride, and provide current to the pad rather than directly to the tensile element. Close proximity of the pad and the tensile element may enable good thermal coupling between them.

Companies involved with the development of new display technologies such as Organic Light Emitting Diode (OLED) and Quantum Dot displays (QLED) have developed new substrates that can survive the required process temperatures while maintaining preferred optical, chemical, and physical properties. An exemplary material in this context is Poly Ethylene Naphthalate, PEN, developed by DUPONT TEIJIN FILMS. Another favored material capable of withstanding even higher processing temperatures is polyimide, such as KAPTON. Both of these materials have thermoplastic properties; i.e., they can be softened by heating and subsequently re-hardened by cooling. In contrast with thermo-setting materials, this cycle can be repeated. In the softened state, the material can be thermally formed, for example in a heat press. When cooled, thermo-formed thermoplastic materials such as PEN and polyimide are not rigid, but retain flexibility; this is required for a heat-formed display screen that is repeatedly coiled or uncoiled for example. PEN and PET (polyethylene terephthalate) and polyimide films typically have a flexural modulus in the range of 2-3 GPa, representing a desired level of flexibility (tendency to bend) for ease of winding the membrane into a coil having a small radius, desired for compactness in certain mobile devices for example.

In some contexts it may be beneficial to eliminate a winding spool and provide a means for tightly winding a membrane element to achieve a minimal outside diameter of the retracted form. When a rollable display or keyboard is integrated with a smart phone for example, it may be desirable for this outside dimension to be 1 cm or less.

In some contexts it may be beneficial to provide a simple retraction mechanism that is low in cost, by eliminating elements that are conventionally required, such as a spool with associated bushings, or a retraction motor with associated mechanical drive components and electrical driver circuits.

In some contexts it may be beneficial to provide a simple retraction mechanism that operates with low stresses applied to the membrane, especially during winding and unwinding operations, such that the mechanism can endure many thousands of deployment cycles.

In some contexts it may be beneficial to provide a fast method of retraction, enabling the use of effective strategies for improving drop performance. For example, if free-fall is detected by a sensor, the membrane may be retracted before the device hits the floor. For this strategy to be effective, a retraction time of a fraction of a second is desirable.

In some contexts it may be beneficial to provide a retractable element having aesthetic appeal. This may be accomplished by eliminating frames or braces that are typically required to support the membrane around its edges, or even more obtrusively in central areas. The aesthetic appeal may be desirable while providing a high-functioning element, not compromising on optical quality in the case of a display for example.

In some contexts it may be beneficial to provide a retractable element that is easily interfaced to a motherboard of a device, including both electrical and mechanical aspects. For example, active matrix organic light emitting diode (AMOLED) devices typically require more than 20 electrical signals to be routed between row-and-column driver circuits on a motherboard and individual pixels on a display.

FIG. 1 illustrates a device 10 in retracted form. An enclosure 11 is shown, preferably comprising a plastic or a metallic material. Enclosure 11 includes a rotatable lid 12 that, in an exemplary embodiment, comprises a non-metallic material that will not inhibit propagation of radio waves. Lid 12 attaches at a hinge 13. A flexible membrane 14 is shown in retracted form. Electrical connections 15 between circuits on membrane 14 and a motherboard 16 are provided. The electrical connections may comprise a clamping element 17 and an anisotropic conductive film, ACF, 18 positioned between corresponding conductive pads (not shown) on the motherboard and the flexible circuit. An adhesive pad 19 is shown between a fixed portion 20 of membrane 14 and a fixed support member 21. Membrane 14 may comprise display circuits, and display drivers 22 may be provided on motherboard 16. An optional wireless transceiver 23 is also shown, for wirelessly connecting device 10 with a local or remote host. Device 10 can also be electrically connected to an external host using a wired interface, as is known in the art. The wired interface may employ a universal serial bus, USB, interface as an example. A battery 24 is shown for providing power to device 10. A processor or controller 25 is provided on motherboard 16. A contamination guard 26 is shown, protecting active elements in the device from coffee spills for example. The base 27 of device 10 may have holes (not shown) for draining unwanted liquid contaminants. Guard 26 also serves as a cover for aesthetic appeal of device 10 when lid 12 is open as in FIG. 2. Circuit board 16 may also include a sensor chip 28, a tri-state driver chip 29, and an interface chip 30 to be further described. Device 10 may have a slim profile and dimensions that will fit comfortably in a shirt pocket for example. Larger versions of device 10 may fit comfortably in a purse or a satchel or a briefcase as examples.

Figure 2:
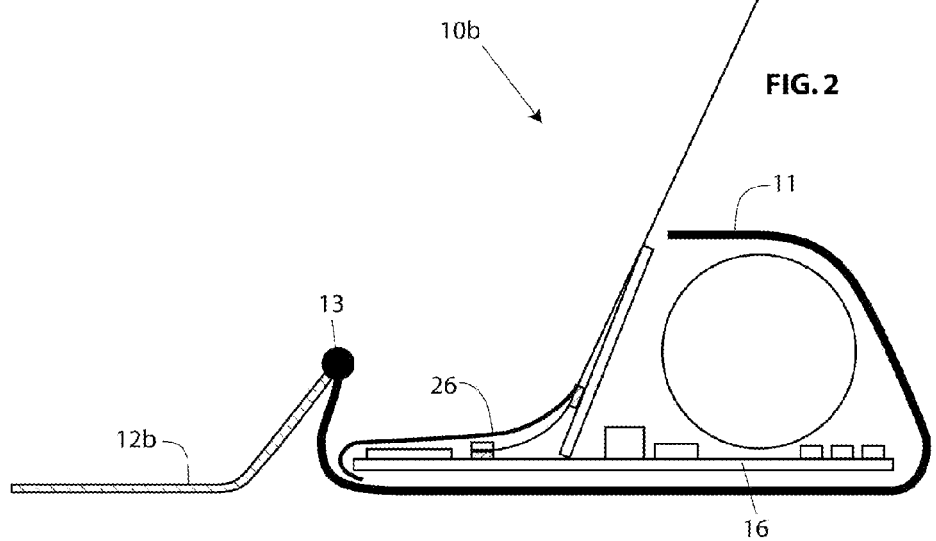
FIG. 2 is a cross-sectional side view of the device of FIG. 1 wherein the extendable element is extended (the "extended form").

FIG. 2 depicts device 10 of FIG. 1 in extended form 10b. Membrane 14 of FIG. 1 is labeled 14b in extended form. Lid 12 is labeled 12b when laid open using hinge 13 to allow extension of membrane 14b. An angled element 32 is shown at the tip of the extended display. Element 32 may be used as a structural element for mechanically stabilizing the extended form 10*b*, and may also be used to impart a slight curvature to membrane 14*b*, for mechanical stability of the lightweight membrane.

Figure 3:
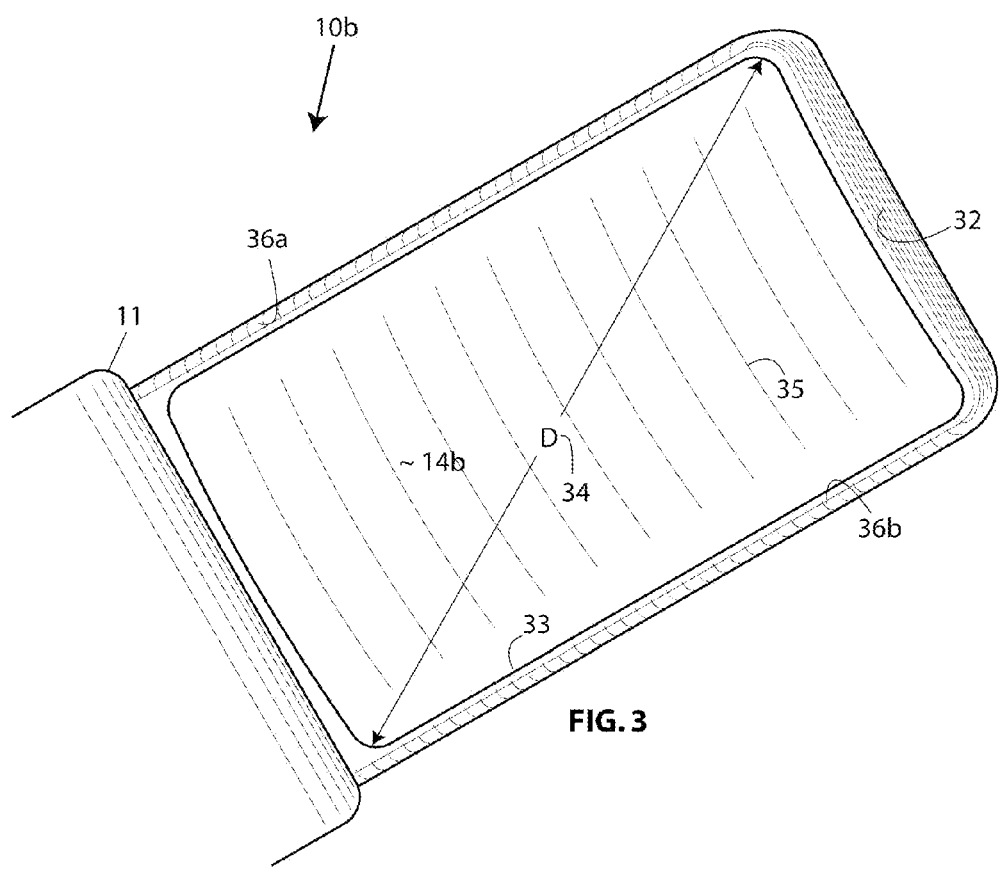
FIG. 3 is a perspective view of a preferred single shell construction of the extended membrane.

FIG. 3 shows a perspective view of the extended form 10*b* of device 10 of FIG. 1. Extended membrane 14*b* is shown. An active display area 33 is shown, having a diagonal measure D, 34, for example, typically in the range of 3-24 inches for an electronic display. A slight curvature 35 may be imposed for mechanical stability; curvature 35 may be imposed by angled element 32, or by a curved slot (not shown) in enclosure 11 through which the membrane passes during egress, or by a combination of the two. Longitudinal edges 36*a* and 36*b* also may have an imposed curvature as shown. Curvatures 35, 36*a*, and 36*b*, and angled element 32 are structural features that may be used individually or in combination to provide stiffness in membrane 14*b* in the extended form shown; the structural features may be formed in a heat press, as is known in the art. The curved features may also be formed by depositing tensile elements as thin films in selected areas, wherein the films shrink after deposition and pull the flexible membrane into the desired shape.

Figure 4:
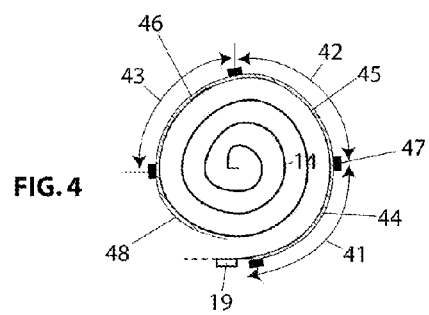
FIG. 4 is a schematic illustration of a retracted membrane configured with a repeating pattern of tensile element segments.

FIG. 4 is a schematic view showing a pattern of repeating segments applied to membrane 14 which is in retracted form. Adhesive mechanical support 19 of FIG. 1 is shown. The first few segments are labeled, 41, 42, and 43. During extension of retracted membrane 14 into extended membrane 14*b* of FIG. 2, a tensile element 44 associated with segment 41 will first be activated, to straighten only this segment of the membrane. Next, a tensile element 45 associated with segment 42 will be activated to straighten this next segment of the membrane. The sequence will continue with segment 43 and all of the other segments in serial order until membrane 14 has been completely extended into form 14*b* of FIG. 2. Each tensile element is terminated in a pair of spaced apart electrodes 47, electrically contacted to a strip 48 of tensile material, to be further described. The uncoiling (unwinding or extending) procedure may be performed in a rapid serial sequence, under control of instructions executed in controller 25 of device 10. The tensile elements preferably comprise NITINOL, a shape memory material. Any other material or construction that can impose a tensile force in response to control signals provided by controller 25 of FIG. 1 can be used. NITINOL may be activated by heat, but a different tensile element could be activated by a different stimulus.

Figure 5:
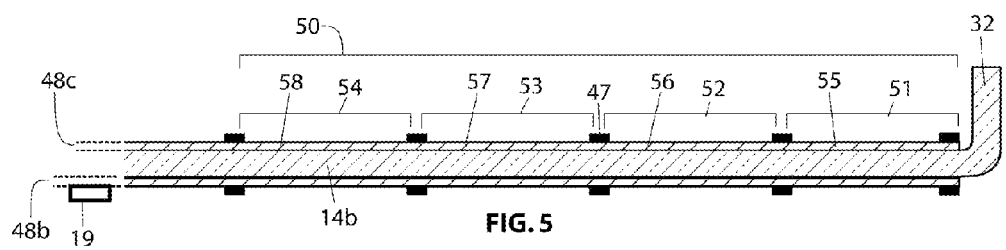
FIG. 5 is an expanded cross-sectional view of a portion of the segmented membrane of FIG. 4 in expanded form.

FIG. 5 depicts a portion of extended membrane 14*b*, including a pattern 50 of straight segments 51-54, and associated tensile elements 55-58, respectively. Again, each tensile element may be terminated in a pair of electrodes such as 47. A strip of tensile material 48 discussed in reference to FIG. 4 is shown on the bottom side of membrane 14*b* labeled 48*b*, and a similar strip 48*c* is shown on the top side. The winding (coiling or retracting) procedure is conceptually similar to the unwinding procedure; it may apply a serial sequence of tensile activations in successive segments of membrane 14*b*, in accordance with instructions executed in controller 25 of FIG. 1. First, tensile element 55 associated with segment 51 will be activated, causing this segment of the membrane to coil (wind up). Next, tensile element 56 associated with segment 52 will be activated, causing this next segment of the membrane to coil. The sequence will continue with segment 53 using its associated tensile element 57, and so on, activating tensile elements in serial order. Controller 25 will activate each tensile element in turn, until the entire membrane is rolled up (coiled) into retracted form 14. It may be desirable to activate each tensile element in rapid sequence. The entire retraction sequence may desirably be performed in a fraction of a second, and this enables a protection strategy for rapidly retracting membrane 14*b* if sensor 28 of FIG. 1 detects that device 10*b* has been dropped.

Figure 6:
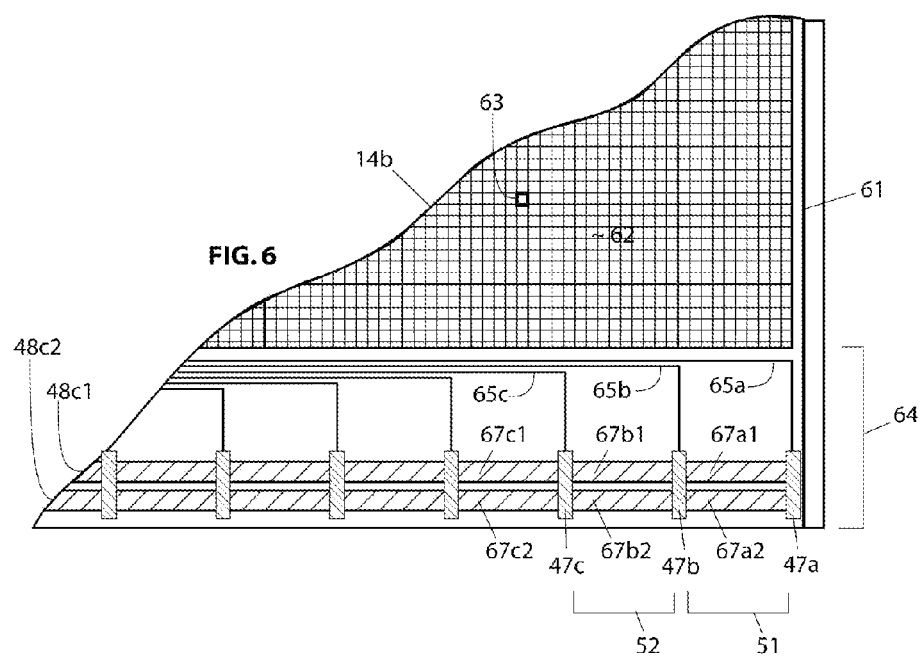
FIG. 6 is a top schematic view of a patterned and segmented membrane in expanded form.

FIG. 6 is a top schematic view of a corner portion of extended membrane 14*b*, including its leading edge 61. Display circuits 62 are shown fabricated on substrate 14*b*. The display circuit will typically comprise multiple pixels 63 with row and column addressing implemented using thin film transistors, TFTs. An edge region 64 of membrane 14*b* is shown where tensile elements are located, including drive lines (conductive traces) such as 65*c* to electrodes such as 47*c*. Electrode 47*c* is a termination electrode to a tensile element such as 67*c*2. Strips of tensile element material 48*c*1 and 48*c*2 are shown. The tensile element material is preferably patterned in longitudinal strips so that the tensile action occurs primarily in the longitudinal direction, and to a negligible degree in the transverse direction. Tensile elements may be provided in parallel as exemplified by strips 48*c*1 and 48*c*2. Electrodes such as 47*c* preferably form a low resistance (ohmic) contact with underlying strips of tensile material 48*c*1 and 48*c*2. Electrodes 47*a*, 47*b*, 47*c*, are driven by conductive traces such as 65*a*, 65*b*, 65*c*, and each of these traces is preferably connected to a tri-state driver circuit 29 provided on printed circuit board 16 of FIG. 1.

Tri-state activation of tensile elements may be used in certain embodiments and will now be discussed. To activate tensile element 67*a*1 and its parallel neighbor 67*a*2, trace 65*a* is driven low (in voltage) while trace 65*b* is driven high, or vice versa. The current so produced in tensile elements 67*a*1 and 67*a*2 causes them to become hot through joule heating. The heat activates the localized portions of strips 48*c*1 and 48*c*2, and their combined tensile action causes the associated segment 51 to coil (curl up). Meanwhile the drivers connected to all of the other electrodes (such as 47*c*) are in their high-impedance state, and consequently no current flows in the other segments of strips 48*c*1 and 48*c*2. After segment 51 has coiled or has almost coiled, the driver connected to electrode 65*a* is turned off (transitions to the high-impedance state) via controller 25. Then trace 65*c* is driven by its associated tri-state driver to the correct voltage polarity to cause current to flow in tensile elements 67*b*1 and 67*b*2 of segment 52, causing these elements to heat, activating the tensile material, and causing this segment to roll up also. Following this sequence of tensile element activations, each of the segments is coiled in turn until membrane 14*b* achieves its fully retracted form, 14 of FIG. 1.

Figure 7:
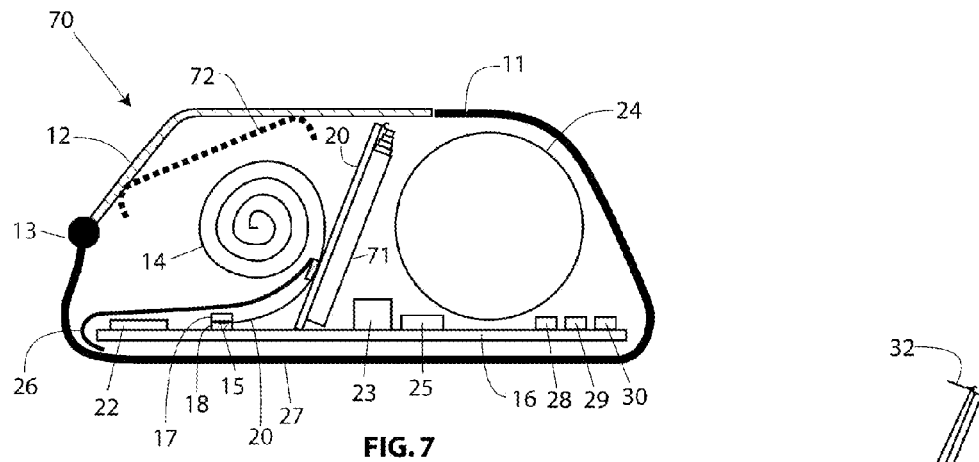
FIG. 7 is a cross-sectional side view of a second preferred embodiment of a self-winding device in retracted form.

FIG. 7 depicts another exemplary device 70. Device 70 is similar to device 10 of FIG. 1 but also includes a retractable support member 71, and an optional cradle 72 adapted to receive a host or companion device such as a smart phone.

Figure 8:
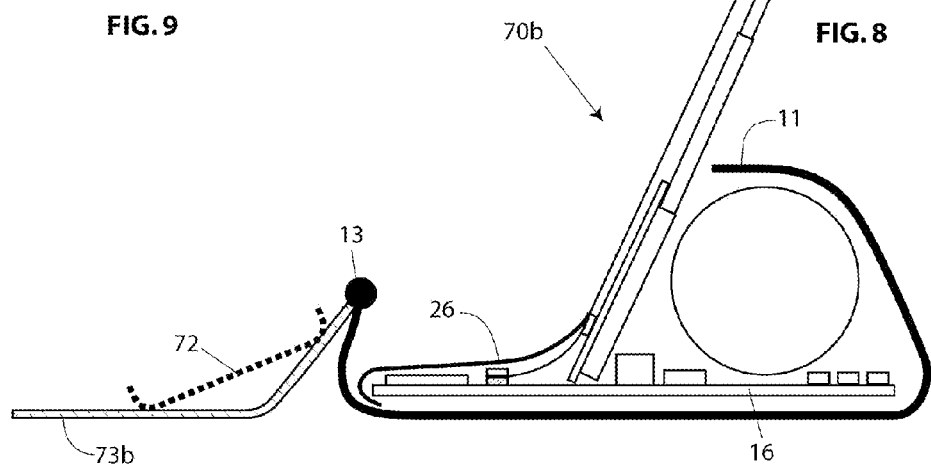
FIG. 8 is a cross-sectional side view of the device of FIG. 7 in extended form.

FIG. 8 illustrates the extended form 70*b* of device 70. Support member 71*b* is shown extended. Support member 71*b* may be a telescoping member as shown. Cradle 72 is shown attached to laid open lid 73*b*, adapted to accept a host or companion device and provide a comfortable viewing/operating angle for a user. Cradle 72 may include a connector (not shown) for connecting a cable between the host device or companion device (not shown) in the cradle and interface chip 30 on motherboard 16 of FIG. 1. The cable may carry video data for example, if device 70 comprises a display and a wireless interface is not employed. Interface chip 30 may employ a standard interface such as universal serial bus, USB, or musical instrument digital interface, MIDI, as examples.

Figure 9:
FIG. 9 is an expanded view of a support arm and a hook and loop attachment for supporting the extendable element in extended form.

FIG. 9 illustrates a hook and loop configuration for attaching the leading edge of extended element 14*b*, shown as angled element 32 of FIG. 2. The user may first activate a control button (not shown) that is interfaced to controller 25 on motherboard 16, causing extendable element 14 to automatically configure itself into extended form 14b, through a rapid sequence of sequential activations as previously described. The user may then extend support element 71 into its extended form 71b and attach a feature such as a hook 82 into a corresponding feature such as a loop 81 provided at the leading edge of extended element 14b, thereby stabilizing the extended element for presentation to the user. Support element 71b preferably includes a locking feature, wherein element 71b can be locked into its extended form, for example, using a twisting motion, as is known in the art.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art. For example, the concepts embodied herein can be applied to a portable device rather than a stand-alone device. Instead of a metal alloy the tensile elements may be formed from a shape memory material containing micrometer or nanometer scale fibers. Connections between the device and a companion device may be wired or wireless. A support member may be manually operated or motor driven; it may be directly or indirectly coupled to the extended element. The extendable element may be single or multi-function and single or multi-layered; for example it may include a display and a touch screen. If a telescoping or otherwise extendable support member is used, the extended membrane may not require any curvature; rather it may be essentially planar when deployed. An external stiffening member such as a rod or tube may be provided at the leading edge of the extended membrane. The retractable device may not be a display but rather a keyboard, a passive screen, a touch screen, a speaker for creating sound, an antenna, or may provide a carrier for another transducer or heating/cooling device, or may be any other flexible device having an extended form and a retracted form.

What is claimed is:

1. A device comprising:
a retractable element comprising a flexible membrane;
tensile elements positioned relative to the membrane such that sequential activation of the tensile elements extends the membrane to an extended form or retracts the membrane to a retracted form, wherein the tensile elements are heat activated, and
a heat applicator configured to heat activate the tensile elements by passing electrical current through the tensile elements.

2. A device comprising:
a retractable element comprising a flexible membrane; and
tensile elements positioned relative to the membrane such that sequential activation of the tensile elements extends the membrane to an extended form or retracts the membrane to a retracted form, wherein the tensile elements are heat activated, and
a film adjacent to the tensile elements and configured to heat activate the tensile elements using joule heating.

3. A device comprising:
a retractable element comprising a flexible membrane;
tensile elements positioned relative to the membrane such that sequential activation of the tensile elements extends the membrane to an extended form or retracts the membrane to a retracted form, wherein sequential activation of the tensile elements achieves the retracted form in less than a second; and
a sensor to detect free fall of the device, and a processor executing instructions to control the sequential activation.

* * * * *